United States Patent Office 3,343,970
Patented Sept. 26, 1967

3,343,970
PROCESS FOR PREPARING DEHYDRATED MASHED POTATO PRODUCT CONTAINING VITAMIN $B_1$
Morton Pader, West Englewood, and Arthur S. Hall, Tenafly, N.J., assignors to Lever Brothers Company, New York, N.Y., a corporation of Maine
No Drawing. Filed Mar. 7, 1963, Ser. No. 263,408
2 Claims. (Cl. 99—207)

This invention relates to an improvement in the preparation of dehydrated cooked mashed potatoes and more particularly to a method of producing vitamin-enriched dehydrated potato flakes.

The manufacture of dehydrated cooked mashed potatoes in the form of potato flakes is a fairly recent development. Briefly, the procedure generally involves peeling and slicing raw potatoes, pre-cooking the potatoes in water or steam, cooling the precooked slices, finally cooking in steam and then mashing the cooked potatoes. At this point, various additives are incorporated into the mash including minor amounts of antioxidants, emulsifiers, milk solids and sulfite stabilizers. The potato mash is then dehydrated and comminuted to yield the desired potato flakes. Upon adding hot water and milk, the flakes reconstitute to provide mashed potatoes having satisfactory appearance and flavor.

A disadvantage in the manufacture of potato flakes is the reduction in the nutritional value of the fresh potatoes during peeling, cooking, and other operations up to and including dehydration. Attempts have been made to alleviate this problem by incorporating nutritional additives such as vitamins into the potatoes during processing. However, this presented still other problems since the flavor of the reconstituted potatoes was adversely affected by the addition of some vitamins. Moreover, it was discovered that the nutritional additives were unstable during processing and it was exceedingly difficult to obtain adequate levels of certain vitamins in the potato flakes without adding a relatively large excess of these vitamins.

In U.S. Patent No. 3,027,264 it was asserted that problems associated with vitamin fortification could be obviated by admixing water-soluble vitamins with a solution of sulfite stabilizers and incorporating the mixture into the potato mash before drying. The patentees suggested that the sulfites apparently provided a protective mechanism to maintain a desirable level of vitamins and especially vitamin C in the product. This patent also discloses that the sulfite-vitamin solution should be added to the potato mash at a point separate from the addition of emulsifiers and antioxidants.

A serious problem arose when attempts were made to incorporate a vitamin mixture containing vitamin $B_1$ into potato flakes by the procedure described in U.S. Patent No. 3,027,264. Sulfites have a destructive effect on vitamin $B_1$ (thiamine) and the latter ingredient could not be incorporated into potato mash in admixture with conventional sulfite stabilizers without destruction of a very large proportion of the vitamin. Consequently, the preparation of potato flakes having a satisfactory flavor and texture upon reconstitution and retaining an acceptable level of vitamin $B_1$ as well as other nutritional values throughout processing would be a desirable advance in the art.

An object of this invention is the development of a process for preparing potato flakes in which vitamin $B_1$ and sulfites can be incorporated without any appreciable loss in the level of vitamin $B_1$ and without any adverse effect on the quality of the reconstituted product.

This and other objects and advantages are attained in accordance with this invention by incorporating vitamins into potato mash at a point during the processing of potatoes as far removed in point of time as possible from the addition of a solution containing sulfite stabilizers. By thoroughly blending the sulfites into the potato mash before adding the vitamins, the destructive effect of the sulfites upon vitamin $B_1$ is avoided in large measure, without adversely affecting the qualities of the potato flakes.

Aside from the means of incorporating additives, the procedures employed in preparing the potato products of this invention are quite well-known to those skilled in the art. These procedures are disclosed, for example, in U.S. Patents Nos. 2,759,832, 2,780,552 and 2,787,553 as well as in numerous publications, particularly those available from the U.S. Department of Agriculture. While the preferred procedure is described in the working examples of this application, it is not intended to limit the scope of the invention to any particular means of preparing dehydrated cooked potatoes subject to the unique method of incorporating additives in accordance with the principles of this invention.

After peeling the raw potatoes such as by abrasion or lye treatment, they may be trimmed to remove blemishes and eyes and are then sliced into slabs of about ½ to ⅝ inch thickness. The slices are usually dipped in a preservative solution and may then be pre-cooked by heating in water at a temperature of 160°–165° F. for about 20 minutes. If a precooking step is employed, it is generally preferred to follow with cooling of the precooked slices to about room temperature or lower. This may be accomplished by using running water. Cooking is completed by the use of steam at atmospheric pressure for about 30 minutes. If desired, the cooked potatoes may be riced by forcing them through a perforated screen. The various additives are then blended into the potatoes. Since this blending step can also serve to mash the potatoes, the ricing step may be omitted. The mash is then dehydrated by application to a drum drier, and the product subsequently comminuted, screened and packaged.

In a continuous operation, an auger connecting the cooker and the drum-drier may be employed to transfer cooked potatoes from the former to the latter. The auger partially mashes or breaks up the cooked slices as they are conveyed from the cooker to the drier and additives are incorporated in the potatoes during this operation.

As stated above, it is absolutely necessary in order to attain the objectives of the invention that the vitamins be added to the potatoes at a point as far as possible in time from the point of addition of the sulfite stabilizers. It is also highly desirable that emulsifiers, antioxidants and milk solids be incorporated separately from the point of addition of the vitamins.

In a batch operation, this result can be accomplished by adding the solution of sulfites to the potato mash in a mixer and thoroughly blending in these stabilizers. The emulsifier, antioxidant and milk solids can then be added separately or together in an aqueous slurry. After thoroughly admixing these ingredients in the mash, the vitamins are incorporated generally as an aqueous solution and intimately blended into the potato mash which is then dried.

In a continuous operation, the order of addition of the ingredients is unchanged and a maximum amount of time is allowed between the incorporation of sulfites and the addition of vitamins. In certain instances to be explained more fully in the working examples, it was necessary to incorporate the vitamins into the mash as the latter was applied to the drum drier.

The vitamins are preferably added in the form of an aqueous solution. Individual vitamins can be incorporated if desired. However, it is preferred to add a mixture of water-soluble vitamins including $B_1$, $B_2$, C and niacin. The proportion of vitamins added will vary depending upon the ultimate levels desired in the final product.

The emulsifiers and antioxidants are those conventionally employed in the art of preparing dehydrated cooked mashed potatoes and this invention is not limited to the utilization of any particular compounds. Virtually any edible emusifier can be added although monoglycerides are preferred. Examples include glyceryl monopalmitate, monostearate and monoglycerides of saturated monocarboxylic acids of about 12 to 20 carbon atoms. Emulsifiers derived from other alcohols such as propylene glycol are also suitable. It is emphasized that the selection of any particular material is within the purview of one skilled in the art.

Edible antioxidants conventionally used in preparing dehydrated foods include butylated hydroxyanisole, butylated hydroxytoluene, etc. Whole or skim milk solids may likewise be added.

Furthermore, the selection of proportions of these additives is not a part of the present invention. Optimum amounts can readily be determined in accordance with the disclosures of the prior art. Additive levels as described and claimed in copending application Ser. No. 105,302 filed April 25, 1961, may also be employed in the present process.

In practicing the invention via a batch operation, the additives are added to the mash and thoroughly mixed therein prior to drum drying. In introducing the additives, the sulfite solution is first thoroughly mixed into the mash before adding the antioxidant, the milk powder and the edible emusifier. The concentrated solution of vitamins is added last, after waiting the maximum practical time.

In changing to a continuous operation, the addition of dry powders such as skim milk and emulsifier may be employed. However, good control over the rate of addition is obtained by incorporating the dry ingredients as an aqueous slurry. The order of addition is not changed, leaving a maximum time between the addition of sulfites and the vitamin solution.

Whether a batch or continuous operation, the time delay between addition of sulfite(s) and of vitamin solution is dictated by practical considerations. In a batch operation, excessive holding of hot mashed potatoes prior to dehydration can result in deterioration of texture, flavor and color. The time lapse must not be so long as to cause such a defect. In a continuous operation, the same factors must be considered, in addition to rate of production, capacity of equipment, floor space available, etc. Thus, the shortest time delay is used that is compatible with obtaining the desired result. This time will vary with the characteristics of the starting potatoes, temperature and degree of mashing of the cooked potatoes when additives are introduced, and manner of introduction of the additives. However, one skilled in the art will be able to determine optimal conditions quickly for his particular potato flake operation.

The drier in the continuous operation described in the following examples consisted of two single drums; operated independently. It was fed by a 25-foot auger connected to the discharge of the potato cooker. The auger formed a T in the drier housing dividing the mash to feed each drum. Since only one drum was used initially, only one side of the T was modified for the incorporation of additives. The sulfite solution was introduced at a point close to the cooker end of the auger allowing for thorough mixing before the introduction of the slurry and vitamin solution. Two inlet ports for the separate addition of slurry and vitamins were placed on the left lateral side of the T off the auger, at a point giving maximum separation between the point of vitamin addition and the sulfite introduction point.

The use of both drums of the drier necessitated relocation of the slurry inlet to a point 12 inches before the junction of the T. The vitamin solution addition point was moved to discharge directly above the mash exit feeding each drum. This change minimized fluctuations in the residual vitamin content of the finished product.

Example I

In a pilot operation, Michigan Russet Rural potatoes were abrasion-peeled, cut into ½ inch slices and dipped in a 0.5% solution of citric acid and sodium bisulfite. The slices were pre-cooked in water for 20 minutes at 160° F. and cooled to 70° F. for 20 minutes in flowing water. The slices were cooked in steam (atmospheric pressure) for 20 minutes and mashed in a Hobart mixer for 1 minute. A sulfite solution (30 ml.) of 3 parts $Na_2SO_3$ and 1 part $NaHSO_3$ was added to 30 lbs. of mash and mixed in for 2 minutes. During the mixing 5.5 g. of nonfat milk solids, 5.5 g. of monoglyceride (Myverol 18:07) and 1.6 ml. stabilizer (Tenox IV) were added. Lastly, 25 ml. of a solution of thiamine (1 mg./ml.), riboflavin (0.4 mg./ml.), niacin (12 mg./ml.) and ascorbic acid (164 mg./ml.) was added and mixed in the mash for 2 minutes. The mash was immediately applied to the drum and dried.

The drum drier used was a modified double-drum drier, each drum 18 inches long and 12 inches in diameter, heated by steam. Mash was applied to the nip of the two drums, which were set about ¼ inch apart. Only one drum was heated, the other serving as an applicator roll. Mash was rolled onto the heated drum by means of a hand-operated roller to ensure good dried potato sheet formation. The drums were rotated towards each other at about 1 r.p.m. The steam pressure was maintained at about 40 p.s.i.g., and changed slightly as necessary to ensure the formation of a uniform sheet with not more than about 6–7% moisture. The sheet was removed from the drum by means of a doctor blade. The sheet was then comminuted coarsely.

The comminuted dehydrated product (93–100 grams) was reconstituted with hot water (1½ cup) and milk (½ cup) at about 160° F. The mashed potatoes had a desirable appearance and an excellent taste.

Example II

Michigan Russet Rurals were prepared and cooked as in Example I. The cooked slices were mashed in a Hobart mixer for 1 minute after which the sulfite solution (described in Example I) was added and thoroughly mixed in for 3 minutes. The skim milk powder and Myverol 18:07 were made into a slurry using 270 gm. of milk powder, 27 gm. of Myverol 18:07 and 250 ml. of water for 30 lbs. of mash. The slurry was added during the sulfite mixing cycle. The vitamin solution was then slowly added and mixed into the mash for an additional minute. The minimum time between the sulfite addition and the vitamin addition was 3 minutes. The mash was then applied to the drum and dried as in Example I.

Example III

In a one drum continuous operation, the sulfite solution addition point was in the cooked slice auger, close to the cooker and approximately 25 feet from the antioxidant-skim milk solids-monoglyceride slurry and vitamin addition points. The auger broke the soft slices and mixed the sulfite solution into the small pieces. It required about 30 to 60 seconds for the potatoes to reach the slurry and vitamin addition points. The distance between the addition points of sulfite and vitamins was the greatest allowable, so great that the mixing of the vitamins and slurry was accomplished mainly on the first and second applicator rolls of the drum drier. The drum drier employed was 10 feet long and 3½ feet in diameter, and equipped with four rolls for application of mash. Potatoes and additives were fed at such a rate that flake (containing about 6% moisture) was obtained at a rate of approximately 300 lbs./hr. when the steam pressure was about 60 p.s.i.g. and drum speed 1.7 r.p.m. The sulfite solution consisted of 0.6 part $Na_2SO_3$ plus 0.2 part NaHSO₃ in 60 parts water. The additive solution (other than vitamins) contained 126 parts water, 2.8 parts distilled monoglyceride from hydrogenated cottonseed oil, 0.525 part antioxidant mixture (Tenox IV), and 2.8 parts of skim milk powder. The vitamin solution contained:

|  | mg./ml. |
|---|---|
| Vitamin $B_1$ | 0.1 |
| Vitamin $B_2$ | 0.04 |
| Vitamin C | 12 |
| Niacin | 1.2 |

The sulfite was added at a rate such as to give 200–400 p.p.m. $SO_2$ in the finished flakes, and was varied according to analytical result as the run proceeded. The emulsifier-milk solids-antioxidant slurry was added at a rate such that the milk solids content of the flake was about 0.2%. The rate of feed of the vitamin solution was adjusted to provide approximately 1 mg. of vitamin $B_1$/100 g. of potato flakes.

The drum conditions were such as to optimally dry the mash without scorching the flake on one hand or incompletely dehydrating the mash on the other, and yet obtain a good production rate. Other conditions undoubtedly could be used within limits known to those skilled in the art.

The dehydrated potato sheet was comminuted to flakes by means of a mill with a ¼ inch mesh screen.

The flakes when reconstituted as in Example I had excellent flavor, color, and texture (reconstitution ratio=91 g. flakes/2 cups liquid).

In this operation, the vitamin solution contained ascorbic acid and vitamins $B_1$, $B_2$, and C. The $B_1$ content was 0.1 mg./ml. The solution was metered in as indicated at such a rate as to provide a theoretical increase in $B_1$ content over the unfortified flake of approximately 1 mg./100 g. potato flakes. In an identical run, vitamins were not added. Analysis of the flakes obtained in the two runs showed:

|  | ml./100 g. flakes |
|---|---|
| Vitamin $B_1$ added | 1.19 |
| Vitamin $B_1$ not added | 0.27 |
| Vitamin $B_1$ recovered | 0.92 |

Thus, recovery of the added vitamin $B_1$ was about 92% when the vitamin was added as described. This is quite remarkable considering the marked destructive effect of sulfite on vitamin $B_1$.

*Example IV*

In a two drum continuous operation, the aqueous slurry and vitamin solution inlets were moved to the bottom of the auger at the junction point where the potato flow was split to feed the two separate drums. Using this addition point, it was difficult to control the vitamin addition for two reasons: (1) pressure built up at the point of addition and did not allow for a free flow of the vitamin solution; (2) when the potato flow was low, the vitamin solution flowed downward in the auger and mixed with the free sulfite solution, a condition which could not be tolerated. Because of these reasons, there was utilized an independent vitamin line discharging directly onto the mash of the first applicator roll. This gave the maximum distance from the sulfite addition point and still allowed for mixing of the vitamins into the mash before drying. Conditions of temperature, drum speed, etc. were as in Example III.

*Example V*

In this process, the potatoes after cooking were conveyed by means of a screw conveyor to the drum-driers, mashing being completed just prior to the application of the potatoes to the driers. Sulfite and bisulfite, in solution, were added as close to the exit end of the potato cooker as practical. The potatoes plus sulfite were then coveyed a distance of about 10 feet by means of the conveyor. Some mashing occurred during this period and the sulfite solution was taken up by the potatoes. A slurry of skim milk powder, anti-oxidant, and monoglyceride was then metered onto the conveyor to be taken up in turn by the potatoes. Finally, at a distance of 15–20 feet from the point of addition of the sulfite solution, a solution of vitamins (Vitamins C, $B_1$, $B_2$ and niacin as in Example III) was metered onto the conveyor and was absorbed by the potatoes which were taken mashed and dried as in Example III.

In an alternative procedure, the vitamin solution was metered directly onto the mashed potatoes as the mash was applied to the drum. Adequate mixing of the vitamin solution and mashed potatoes occurred as the mash was distributed over the drum.

As used in the examples, Tenox IV is a food grade antioxidant containing 20% butylated hydroxyanisole and 20% butylated hydroxytoluene as active ingredients. Myverol 18:07 is a molecularly distilled fraction of a fatty oil having a high monoglyceride content.

We claim:
1. A method of preparing dehydrated cooked mashed potatoes which comprises: (a) peeling and slicing raw potatoes, (b) precooking the potatoes at about 160° F. and cooling them to room temperature, (c) finally cooking the potatoes in steam and mashing them, (d) mixing into the potato mash an aqueous solution of $Na_2SO_3$ and $NaHSO_3$, (e) mixing into the potato mash dry milk solids, an emulsifier and an antioxidant, (f) incorporating into the potato mash an aqueous solution containing at least one water-soluble vitamin, including vitamin $B_1$ and (g) drum-drying the potato mash.

2. In a continuous method of preparing dehydrated cooked mashed potatoes wherein raw potatoes are peeled, sliced, cooked, mashed and dried, the improvement comprising: (a) adding a solution of sulfite stabilizers to the cooked potatoes shortly after they emerge from the cooker, (b) adding an aqueous slurry of milk solids, emulsifier and antioxidant to the potatoes after the sulfite solution has been thoroughly admixed with the potatoes, (c) subsequently incorporating an aqueous solution of vitamins, including vitamin $B_1$ into the mashed potatoes at a point just prior to drying thereof and (d) drying the potatoes.

References Cited

UNITED STATES PATENTS 3,027,264  3/1962  Irmiter et al. _____ 99—207

OTHER REFERENCES

Braverman, "Citrus Products," 1949, Interscience Publishers, Inc., New York, pp. 158–159.

A. LOUIS MONACELL, *Primary Examiner.*

HYMAN LORD, *Examiner.*

S. J. BAICKER, J. M. GOLIAN, *Assistant Examiners.*